(12) United States Patent
Lepoutre

(10) Patent No.: US 6,234,211 B1
(45) Date of Patent: May 22, 2001

(54) PIPE FOR THE DUCTING OF GASEOUS FLUIDS NOTABLY IN CARS

(75) Inventor: Henri Lepoutre, Roubaix Cedex (FR)

(73) Assignee: Westaflex Automobile (FR)

( * ) Notice: Subject to any disclaimer, the term of this patent is extended or adjusted under 35 U.S.C. 154(b) by 0 days.

(21) Appl. No.: 09/425,791

(22) Filed: Oct. 22, 1999

Related U.S. Application Data

(63) Continuation of application No. PCT/FR98/00863, filed on Apr. 29, 1998.

(30) Foreign Application Priority Data

Apr. 30, 1997 (FR) .................................................. 97 05361

(51) Int. Cl.$^7$ .................................................. F16L 11/12
(52) U.S. Cl. ........................... 138/114; 138/125; 138/148
(58) Field of Search .................................. 138/114, 125, 138/140, 148

(56) References Cited

U.S. PATENT DOCUMENTS

| | | | |
|---|---|---|---|
| 1,190,292 | 7/1916 | Hopkins . | |
| 2,089,492 | 8/1937 | Lambert | 138/76 |
| 2,486,387 | 11/1949 | Bringolf | 138/56 |
| 2,669,258 | 2/1954 | Spitz | 138/55 |
| 2,906,638 | 9/1959 | Herman | 117/7 |
| 2,943,644 | 7/1960 | Mosely | 138/56 |
| 3,205,913 | 9/1965 | Ehlers | 138/125 |
| 3,255,780 | 6/1966 | Squirrell et al. | 138/122 |
| 3,374,856 | 3/1968 | Wirt | 181/42 |
| 3,404,445 | * 10/1968 | Crouse | 138/148 |
| 3,554,237 | 1/1971 | Pelley et al. | 138/122 |
| 3,642,034 | 2/1972 | Ullman et al. | 138/144 |
| 3,706,326 | 12/1972 | Bringolf | 138/129 |
| 4,013,102 | 3/1977 | DeLorean et al. | 138/144 |
| 4,153,080 | 5/1979 | Murray, Jr. et al. | 138/126 |
| 4,161,231 | * 7/1979 | Wilkinson | 138/155 |
| 4,304,266 | 12/1981 | Kutnyak et al. | 138/129 |
| 4,402,346 | 9/1983 | Cheetham et al. | 138/129 |
| 4,450,873 | * 5/1984 | Sadler et al. | 138/125 |
| 4,452,280 | 6/1984 | Werner | 138/131 |
| 4,547,193 | 10/1985 | Rydell | 604/282 |
| 4,576,205 | * 3/1986 | Morinaga et al. | 138/125 |
| 4,684,556 | * 8/1987 | Ohtsuga et al. | 138/125 |
| 4,723,579 | * 2/1988 | Hyodo et al. | 138/125 |
| 4,926,909 | 5/1990 | Salinas | 138/109 |
| 5,056,282 | * 10/1991 | Pflieger | 138/97 |
| 5,077,107 | * 12/1991 | Kaneda et al. | 138/125 |
| 5,164,237 | * 11/1992 | Kaneda et al. | 138/125 |
| 5,325,893 | 7/1994 | Takagi et al. | 138/143 |
| 5,416,270 | 5/1995 | Kanao | 174/47 |
| 5,526,849 | 6/1996 | Gray | 138/133 |
| 5,603,358 | 2/1997 | Lepoutre | 138/149 |
| 5,778,941 | 7/1998 | Inada | 138/134 |
| 5,954,096 | 9/1999 | Lepoutre | 138/129 |

FOREIGN PATENT DOCUMENTS

| | | |
|---|---|---|
| 538 748 | 8/1973 | (CH) . |
| 2 341 055 | 2/1974 | (DE) . |
| 90 15 414 U | 3/1991 | (DE) . |
| 0 318 232 A1 | 5/1989 | (EP) . |
| 0 638 755 A1 | 2/1995 | (EP) . |
| 0 643 248 A1 | 3/1995 | (EP) . |
| 1225681 | 7/1960 | (FR) . |
| 1369458 | 7/1964 | (FR) . |
| 2331265 | 6/1977 | (FR) . |
| 2535010 | 4/1984 | (FR) . |
| 2589551 | 5/1987 | (FR) . |

(List continued on next page.)

*Primary Examiner*—James Hook
(74) *Attorney, Agent, or Firm*—Renner, Kenner, Greive, Bobak, Taylor & Weber

(57) ABSTRACT

A pipe for the ducting of gaseous fluids, notably in cars, characterised in that it includes a porous interior tube (1), permeable to gaseous fluids and likely to lessen noise transmission, and an exterior tube (2), which is essentially rigid and forms an envelope distant from the interior tube, in a material essentially non-permeable to gaseous fluids.

15 Claims, 1 Drawing Sheet

FOREIGN PATENT DOCUMENTS

| | | |
|---|---|---|
| 2720471 | 12/1995 | (FR) . |
| 2762892 * | 11/1998 | (FR) . |
| 1054392 | 1/1967 | (GB) . |
| 2146070 | 4/1985 | (GB) . |
| 2227544 | 8/1990 | (GB) . |
| 08081994 | 3/1996 | (JP) . |
| WO 89/12733 | 12/1989 | (WO) . |
| WO 91/00466 | 1/1991 | (WO) . |

* cited by examiner

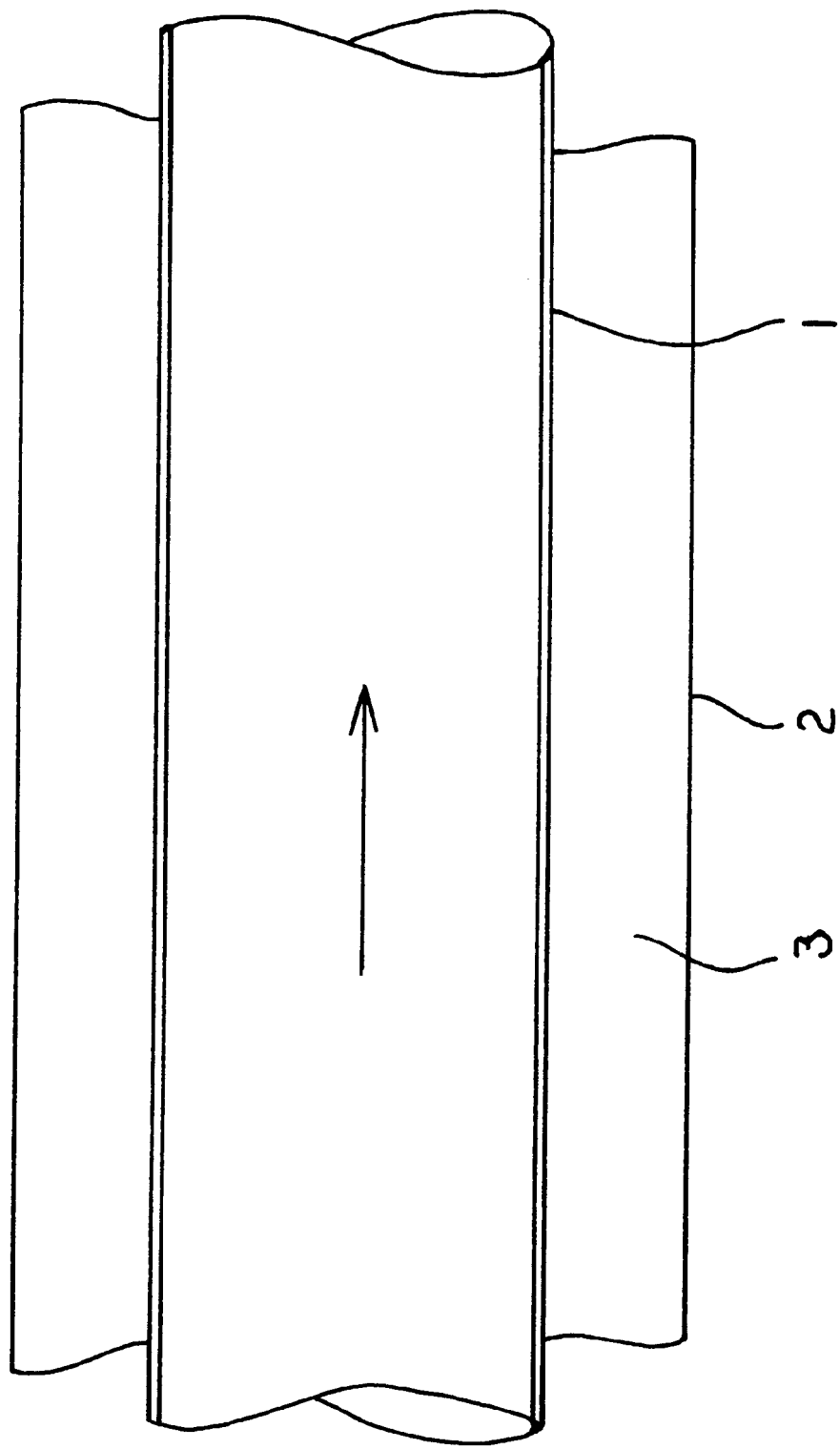

PIPE FOR THE DUCTING OF GASEOUS FLUIDS NOTABLY IN CARS

This application is a continuation of PCT/FR98/00863, filed on Apr. 29, 1998.

The present invention relates to pipes for the ducting of gaseous fluids, and it particularly but not exclusively applies to such a pipe which is used to transport air within cars, especially in engines.

The invention especially applies to a pipe which is used in a car engine and is sited after the air filter to duct the air for combustion towards the engine block. In this particular application it is known that air intended for combustion and delivered to the engine must be clean and this is made possible by the air filter. It is therefore necessary that this pipe, in its entirety, cannot pneumatically communicate with the outside as such a gaseous exchange between the outside and the inside would spoil the clean air ducted by the pipe.

It is also known that the car industry is particularly mindful of noise reduction.

The aim of the invention is therefore to supply a pipe of the type described above which, whilst preventing a gaseous exchange between the outside and the inside, reduces noise emissions.

To this end, the pipe according to the invention is characterised in that it includes a porous interior tube which is permeable to gaseous fluids and which reduces noise transmission, and an essentially rigid exterior tube, which forms an envelope that is distant from the interior tube in a material essentially non-permeable to gaseous fluids.

According to the present invention, the pipe is therefore used as both a pipe for the ducting of gaseous fluids without a gaseous exchange with the outside, and a noise silencer.

Contrary to traditional silencers, which include an interior tube either interrupted or including openings, and an exterior tube functioning with entering in resonance, the pipe according to the invention, in its silencing action, functions without entering in resonance as the interior tube has a porous surface. The gaseous fluid can only move from the inside to the outside of the porous tube and reciprocally, with passing through its porous surface. With the porosity of the interior tube being achieved through very small openings, the viscosity of the gaseous fluid becomes preponderant, which in turn results in an energy loss by friction as the gaseous fluid passes through and stops the on-set of resonance, as this energy outlay reduces all movements of the fluid.

The interior tube is advantageously fibrous, for instance based on polyester fibres, whereas the exterior tube, which is essentially rigid, in for example made of plastic, notably of polypropylene.

BRIEF DESCRIPTION OF THE DRAWING

The invention will be well understood when reading the following description and with reference to the annexed FIGURE, which forms part of the description and the only FIGURE of which is a drawing of a pipe according to the invention viewed from the side and open.

According to the FIGURE, the porous interior pipe, for instance the straight section is referenced as 1 and the rigid exterior pipe, for instance co-axial and forming an envelope, is referenced as 2. Tubes 1 and 2 are straight with a circular section and, in the preferred application, ie to duct clean air for combustion in an engine, they are generally of the same length and extend over the same distance, between the air filter and the engine block.

As indicated above, the porous interior tube 1 is of a fibrous nature, ie based on polyester fibres, whereas the exterior tube which is essentially rigid, is in a plastic material, notably in polypropylene. These two tubes are preferably co-axial.

The degree of porosity of the interior tube is established as a function of requirements. For instance, in the preferred application of ducting clean air for combustion (between the air filter and the engine block of a car), the porosity amounts to twenty litres per minute per square decametre ($dm^2$) of surface and per $10^2$ Pa of depression. The porosity is expressed as volume of air traversing the porous wall by surface unit and in relation to the depression within the porous wall.

The exterior tube 2 is solid and prevents any gaseous exchange between the inside and the outside of the pipe according to the invention, therefore preventing surrounding soiled air to penetrate inside tube 1, which ducts clean air.

However, it was noticed that according to the invention, the exterior tube 2 also functionally intervenes in the noise reduction phenomenon, because of its rigidity preventing sound radiating and also because of its co-operation with the porous interior tube 1.

Therefore, if the intermediate volume 3 between tubes 1 and 2 is zero, or very nearly zero, ie if the inside diameter of tube 2 equals the outside diameter of tube 1, or very closely, the composed pipe behaves like a solid pipe, eg non-porous, with regard to noise reduction. A very small attenuation occurs however, on all frequencies, because of the porous and soft structure of the interior tube 1.

It is therefore necessary that the intermediate volume 3 is not zero.

It was also noticed that according to the invention, the noise reduction resulting from the porous nature of the interior tube 1 increases proportionally with the intermediate volume 3. But a rapid limitation is reached with regard to sufficient room, especially since the increase in noise reduction is nullified as soon as the intermediate volume 3 has reached a certain value.

Therefore, in a realisation for which tubes 1 and 2 are co-axial, the diameter of the exterior tube 2 can vary between 5.25 to fifteen centimetres for a porous interior tube in polyester fibres with a diameter of five centimetres, with an excellent noise reduction on a range of frequency up to at least 1 kHz. Seven to ten centimetres is a preferred range for the diameter of the exterior tube.

It is generally estimated that the ratio of diameters between the exterior tube and the interior tube 1 can vary between 1.05 and three, and preferably between 1.2 and two.

Of course, the invention is not limited to modes of realisation, nor is it limited to modes of application which have been described. On the contrary, many variants could be conceived without exiting the invention's domain. For example, the exterior tube 2 could only partly extend over the length of interior tube 1 where a gaseous exchange between the inside and the outside of the porous interior tube 1 is acceptable. Similarly, the exterior tube 2 could extend over a longer length than that of the interior tube 1. Furthermore, the porous surface inside exterior tube 2 could be non-linear, for instance either because the porous tube is interrupted, or discontinued, or because it features at least one opening in its wall. In addition, the composed pipe according to the invention can constitute only part of a duct, the remainder of which is formed of at least a prolongation of the porous tube or a distinct pipe.

What is claimed is:

1. A pipe for the ducting of gaseous fluids characterized in that it includes an interior tube having pores permeable to gaseous fluids and an exterior tube essentially rigid which forms an envelope distant from the interior tube, in a material essentially non-permeable to gaseous fluids, wherein the tubes are of circular section, the ratio of the diameters of the exterior tube and the interior tube being in the range of 1.05 to 3.

2. A pipe according to claim 1, characterized in that the exterior tube is solid.

3. A pipe according to claim 1 or 2, characterized in that both tubes are co-axial.

4. A pipe according to claim 1 or 2, characterized in that the interior tube is fibrous.

5. If A pipe according to claim 4 characterized in that the fibrous interior tube is based on polyester fibers.

6. A pipe according to claim 1 or 2, characterized in that the exterior tube is in a plastic material.

7. A pipe according to claim 6 wherein the plastic material is polypropylene.

8. A pipe according to claim 1 or 2, wherein the exterior tube extends over the entire length of the interior tube.

9. A pipe according to claim 1 or 2, characterized in that the exterior tube extends only partially over the length of the interior tube.

10. Pipe according to claim 1 or 2, characterized in that the exterior tube extends over a longer length than that of the interior tube.

11. A pipe according to claim 1 or 2, wherein the porous wall of the interior tube is continuous.

12. A pipe according to claim 1 or 2, characterized in that the porous wall of the interior tube is discontinuous, the interior tube being either interrupted or discontinued, or featuring at least one opening in its wall.

13. A pipe according to claim 1 or 2, characterized in that it constitutes the feeding pipe for clean air intended for engine combustion, after the air filter.

14. A pipe according to claim 1 wherein the ratio of the diameters of the exterior tube and the interior tube are from 1.2 to 2.

15. A pipe for ducting gaseous fluids comprising an interior tube whose porosity is not higher than 20 liters per minute per square decameter of surface and per $10^2$ Pa of depression and an exterior tube essentially rigid which forms an envelope distant from the interior tube, in a material essentially non-permeable to gaseous fluids.

* * * * *